United States Patent
McPherson et al.

(10) Patent No.: US 9,342,698 B2
(45) Date of Patent: *May 17, 2016

(54) PROVIDING PRIVACY ENHANCED RESOLUTION SYSTEM IN THE DOMAIN NAME SYSTEM

(71) Applicant: VERISIGN, INC., Reston, VA (US)

(72) Inventors: Danny McPherson, Leesburg, VA (US); Eric Osterweil, McLean, VA (US)

(73) Assignee: VERISIGN, INC., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/531,424

(22) Filed: Nov. 3, 2014

(65) Prior Publication Data
US 2015/0058999 A1    Feb. 26, 2015

Related U.S. Application Data

(63) Continuation-in-part of application No. 13/340,895, filed on Dec. 30, 2011, now Pat. No. 8,880,686.

(51) Int. Cl.
| | |
|---|---|
| *G06F 15/16* | (2006.01) |
| *G06F 21/60* | (2013.01) |
| *G06F 17/30* | (2006.01) |
| *H04L 29/12* | (2006.01) |
| *H04L 29/06* | (2006.01) |

(52) U.S. Cl.
CPC .......... *G06F 21/60* (2013.01); *G06F 17/30864* (2013.01); *H04L 61/1511* (2013.01); *H04L 61/305* (2013.01); *H04L 63/0407* (2013.01)

(58) Field of Classification Search
CPC ................................ H04L 29/12; G06F 21/60
See application file for complete search history.

(56) References Cited

U.S. PATENT DOCUMENTS

| | | | |
|---|---|---|---|
| 7,280,999 B2 * | 10/2007 | Chung et al. | |
| 8,117,319 B2 * | 2/2012 | Raciborski et al. | 709/227 |
| 8,219,644 B2 | 7/2012 | Drako et al. | |
| 8,484,377 B1 * | 7/2013 | Chen et al. | 709/245 |
| 8,880,686 B2 * | 11/2014 | Mcpherson et al. | 709/224 |
| 2006/0165060 A1 | 7/2006 | Dua | |
| 2007/0192500 A1 | 8/2007 | Lum | |
| 2007/0204051 A1 * | 8/2007 | Zhang | 709/230 |

(Continued)

OTHER PUBLICATIONS

Extended European Search Report dated Apr. 18, 2013, European Application No. 12199642.5 filed Dec. 28, 2012, pp. 1-4.

(Continued)

*Primary Examiner* — Hassan Kizou
*Assistant Examiner* — Abdelnabi Musa
(74) *Attorney, Agent, or Firm* — MH2 Technology Law Group, LLP

(57) ABSTRACT

An apparatus and a non-transitory computer-readable medium may perform a method of minimizing the disclosure of a domain name contained in a DNS query. The method may include determining a first label and a second label associated with a domain name included in a DNS query. A first nameserver may be queried for a first resource record type associated with the first label without revealing information related to the second label by removing information related to the second label from the DNS query. A response may be received from the first nameserver, and the response may include the first resource record type which directs a resolver to a second nameserver. The second nameserver may be queried for a second resource record type associated with the first label and the second label.

16 Claims, 4 Drawing Sheets

(56) References Cited

U.S. PATENT DOCUMENTS

| | | | |
|---|---|---|---|
| 2008/0162724 A1* | 7/2008 | Hietasarka | 709/245 |
| 2010/0011420 A1* | 1/2010 | Drako et al. | 726/5 |
| 2010/0131646 A1* | 5/2010 | Drako | 709/225 |
| 2010/0269174 A1* | 10/2010 | Shelest | 726/22 |
| 2011/0219067 A1 | 9/2011 | Bernosky et al. | |
| 2012/0124239 A1* | 5/2012 | Shribman et al. | 709/245 |

OTHER PUBLICATIONS

Yanbin Lu et al., "Towards Plugging Privacy Leaks in the Domain Name System", Peer-to-Peer Computing (P2P), 2010 IEEE Tenth International Conference on IEEE, Aug. 25, 2010, pp. 1-10.

Fangming Zhao et al., "Analysis of Privacy Disclosure in DNS Query", 2007 International Conference on Multimedia and Ubiquitous Engineering IEEE, Apr. 1, 2007, pp. 952-957.

Hannes Federrath et al., "Privacy-Preserving DNS: Analysis of Broadcast, Range Queries and Mix-Based Protection Methods", Computer Security • Esorics 2011, Sep. 12, 2011, pp. 665-683.

S. Bortzmeyer, "DNS Query Name Minimisation to Improve Privacy", Internet-draft, Internet Engineering Task Force, Oct. 22, 2014, pp. 1-7.

George Barwood, "[dns-operations] I missed the announcement: .ARPA has beendeleted", https://lists.dns-oarc.net/pipermail/dns-operations/2010-February/005003.html, Feb. 16, 2010, p. 1.

* cited by examiner

PROVIDING PRIVACY ENHANCED RESOLUTION SYSTEM IN THE DOMAIN NAME SYSTEM

CROSS-REFERENCE TO RELATED APPLICATIONS

This application is a continuation-in-part of and claims priority to U.S. patent application Ser. No. 13/340,895, filed Dec. 30, 2011, the entire disclosure of which is hereby incorporated by reference in its entirety.

TECHNICAL FIELD

The present disclosure relates generally to methods and systems for providing a privacy enhanced resolution system and, more particularly, to methods and systems for providing a privacy enhanced resolution system in the Domain Name System.

BACKGROUND

The Domain Name System (DNS) is a hierarchical naming system in which "domain names" map to many different types of data, such as an Internet Protocol (IP) address. For example, the domain name www.example.com could translate into the IP address 192.0.43.10. Every domain name is broken into "labels" that are separated by dots. The rightmost label conveys the top-level domain (TLD), and each label to the left specifies a subdomain of the domain to the right. For example, in the domain name "sub.example.com," "cam" is the top-level domain, "example" is the second-level domain, and "sub" is the third-level domain.

To translate DNS domain names to IP addresses, a network of domain nameserver computer systems ("domain nameservers") maintain mappings of domain names to IP addresses. For any particular domain name, at least one domain nameserver is designated as being authoritative for that particular domain name. These authoritative nameservers are not only responsible for their particular domain or domains, but can also assign other name severs for their subdomains. For example, the owner of example.com can delegate authority to sub.example.com, a subtree of the example.com namespace. These delegations are not fixed in the DNS protocol, and domain owners can change them at any time.

Thus, in order for a client resolver to obtain the IP information that corresponds to a domain name, the client computer needs to be able to identify an authoritative nameserver for the domain name. Thus, an application program (e.g., a web browser) running on the client computer may send a query to a DNS resolver requesting the nameserver name and/or IP address associated with the particular domain name. In response, the resolver may either return the answer to the query if it is stored locally in the resolver's local cache, or identify an authoritative nameserver for the requested domain name by contacting one or more nameservers in order to reach the nameserver that can provide the appropriate nameserver names and/or IP addresses. Generally, resolvers are incorporated into operating systems of a client computer, which may in turn be connected to a DNS resolver for the client computer's Internet service provider.

The resolver contacts the nameservers in a hierarchical manner using a sequence of queries starting with the root server to find the server authoritative for the top level domain (e.g., ".com"). Subsequently, a query is provided to the obtained TLD server for the authoritative nameserver for the second-level domains, and those TLD nameservers can then provide information about the authoritative nameservers for the second-level domains. For example, an authoritative nameserver for the ".com" TLD will know the authoritative nameservers for the second-level example.com domain. Continuing in this hierarchical iterative delegation and referral manner as necessary, the authoritative nameservers for the domain name of interest can be identified. Once the appropriate response or responses are obtained from the appropriate authoritative nameserver the resolver returns them to the requesting application.

FIG. 1 is a diagram illustrating an exemplary related art process for obtaining the IP address for "secret.example.com." As shown in FIG. 1, an application sends a request for the nameserver name and/or IP address associated with "secret.example.com" to a resolver (S110). Generally, resolvers have a local cache containing recent domain name lookups. Thus, the resolver may determine whether the cache includes the IP address mapping for secret.example.com locally, and if so, it will return the IP address to the application. If the cache does not contain the IP address mapping desired by the application, the resolver will determine whether it contains nameserver records (the NS set) for the authoritative zone, example.com (S120). If the cache includes the appropriate NS set, the resolver will directly contact the authoritative name servers and request the IP address mappings for secret.example.com. Upon receipt of a query response, the resolver will return the appropriate nameserver name and/or IP address to the application, otherwise the resolver will query the root nameserver for the nameserver name and/or IP address associated with "secret.example.com" (S130). In response, the root server provides the resolver with the designated authoritative nameserver for the appropriate TLD, in this case, the .com nameserver (S140). Since the process for resolving all names is recursive, meaning that the entire domain name (secret.example.com) is sent to each delegation in the namespace until it is answered by a zone that is authoritative for the name, the resolver must send additional queries. Accordingly, the resolver queries the .com nameserver for the nameserver name and/or IP address associated with "secret.example.com" (S150) and receives a response directing the resolver to the example.com nameserver (S160). The resolver then queries the example.com nameserver (S170) and receives a response indicating the nameserver name and/or IP address of "secret.example.com" (S180). After receiving the nameserver name and/or IP address, the resolver transmits the received address to the requesting application (S190).

As shown in FIG. 1, for a client resolver to simply look up "secret.example.com," the DNS root nameserver, the .com nameserver, and the example.com nameserver are each asked for the entire domain name. While this recursive process has been employed for the past three decades, the process has always allowed the zones in DNS to observe many of the names and structure of zones below them in the hierarchy. For example, the operators of .com are able to see a great many of the domain names below (e.g., facebook.com or netflix.com). This can allow the operators to also see who is querying for these names, and at a rough approximation of how often. In essence, the DNS protocol discloses the entire domain name that users may query to each predecessor zone in the domain name. Accordingly, a new mechanism to minimize this information disclosure is needed.

Accordingly, exemplary embodiments consistent with the present invention include systems and methods for obfuscating the query a resolver sends to each authority in the predecessor list of zones. The goal of this approach is to allow clients to resolve names from a domain name authority through an arbitrary number of predecessor zones, without disclosing any more information to any of them beyond the domain they are already delegating to, thus minimizing confidentiality disclosures of named entities to untrusted parties.

BRIEF SUMMARY

Consistent with an exemplary embodiment of the present invention, there is provided a non-transitory computer-readable medium encoded with instructions that, when executed on a processor, perform a method of minimizing the disclosure of a domain name contained in a DNS query. The method may include determining a first label and a second label associated with a domain name included in a DNS query. A first nameserver may be queried for a first resource record type associated with the first label without revealing information related to the second label by removing information related to the second label from the DNS query. A response may be received from the first nameserver, and the response may include the first resource record type which directs a resolver to a second nameserver. The second nameserver may be queried for a second resource record type associated with the first label and the second label.

Consistent with another exemplary embodiment of the present disclosure, there is provided a non-transitory computer-readable medium encoded with instructions that, when executed on a processor, perform a method of minimizing the disclosure of a domain name contained in a DNS query. The method includes determining a first label and a second label associated with a domain name included in a DNS query. A false label may be generated. A first nameserver may be queried for a first resource record type associated with the first label and the false label without revealing the second label to the first nameserver by removing information related to the second label from the DNS query. The first nameserver may be (e.g.,) a root nameserver. A response may be received from the first nameserver including the first resource record type. The first resource record type may direct a resolver to a second nameserver. The second nameserver may be queried for a second resource record type associated with the first label and the second label.

Consistent with yet another exemplary embodiment of the present disclosure, there is provided an apparatus for minimizing the disclosure of a domain name contained in a DNS query. The apparatus includes a memory and a processor communicatively coupled to the memory. The processor may determine a first label and a second label associated with a domain name included in a DNS query. The processor may also query a first nameserver for a first resource record type associated with the first label without revealing the second label to the first nameserver by removing information related to the second label from the DNS query. The processor may also receive a response from the first nameserver including the first resource record type. The first resource record type may direct a resolver to a second nameserver. The processor may then query the second nameserver for a second resource record type associated with the first label and the second label.

Additional exemplary embodiments will be set forth in part in the description that follows, and in part will be obvious from the description, or may be learned by practice of the invention. The exemplary embodiments will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments of the invention and together with the description, serve to explain the principles of the invention. In the drawings.

DETAILED DESCRIPTION

Figure 1:
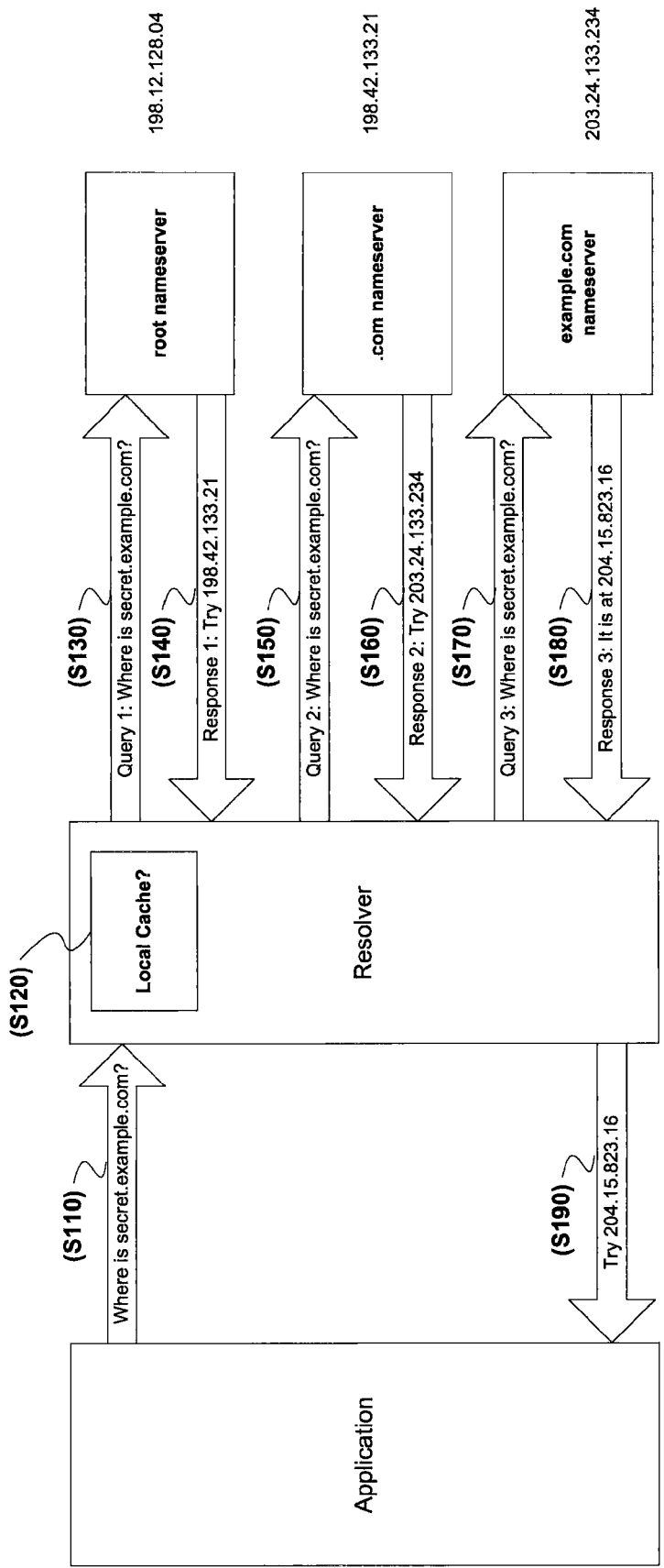
FIG. 1 is a diagram illustrating an exemplary related art process for obtaining an IP address for "secret.example.com."

The following detailed description refers to the accompanying drawings. Wherever possible, the same reference numbers are used in the drawings and the following description to refer to the same or similar parts. While several exemplary embodiments and features of the invention are described herein, modifications, adaptations, and other implementations are possible, without departing from the spirit and scope of the invention. Accordingly, the following detailed description does not limit the invention. Instead, the proper scope of the invention is defined by the appended claims.

Figure 2:
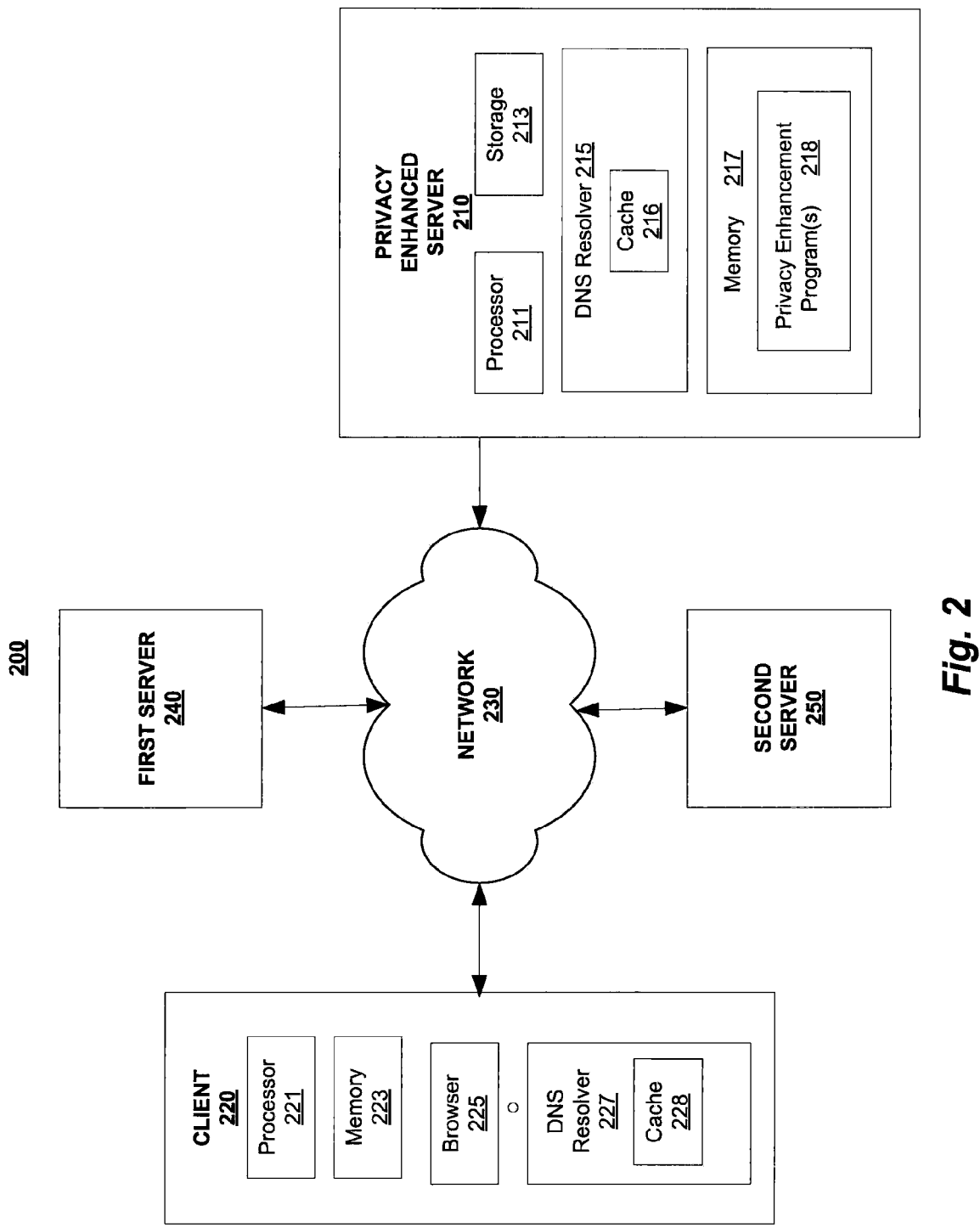
FIG. 2 is a diagram illustrating an exemplary DNS privacy enhancement system consistent with exemplary embodiments.

FIG. 2 is a diagram illustrating an exemplary DNS privacy enhancement system 200 that may be used to implement disclosed embodiments, including exemplary system components. The components and arrangement, however, may be varied. System 200 may include a privacy enhanced server 210, a client 220, a network 230, a first server 240, and a second server 250. Privacy enhanced server 210 may include a processor 211, storage 213, a DNS resolver 215 including a local cache 216, a memory 217, and input/output (I/O) devices (not shown). DNS resolver 215 may be a stub resolver or a recursive resolver. Privacy enhanced server 210 may be implemented in various ways. For example, privacy enhanced server 210 may be a general purpose computer, a server, a mainframe computer, or any combination of these components. Privacy enhanced server 210 may communicate over a link with network 230. For example, the link may be a direct communication link, a LAN, a WAN, or other suitable connection.

Network 230 may be any type of network that facilitates communication between remote components, such as server 210 and client 220. For example, network 230 may be a local area network (LAN), a wide area network (WAN), a virtual private network, a dedicated intranet, the Internet, and/or a wireless network. Privacy enhanced server 210 may be standalone or it may be part of a subsystem, which may, in turn, be part of a larger system.

Processor 211 may include one or more known processing devices, such as a microprocessor from the Pentium™ or Xeon™ family manufactured by Intel™, the Turion™ family manufactured by AMD™, or any other processing device. Storage 213 may include a volatile or non-volatile, magnetic, semiconductor, tape, optical, removable, nonremovable, or other type of storage device or non-transitory computer-readable medium. Memory 217 may include one or more storage devices configured to store information used by processor 211 to perform certain functions related to disclosed embodiments.

In some embodiments, memory 217 may include one or more privacy enhancement programs or subprograms 218 loaded from storage 213 or elsewhere that, when executed by processor 211 or some other component of privacy enhanced server 210, perform various procedures, operations, or processes consistent with disclosed embodiments. For example, memory 217 may include, among other things, a label separation program that separates a domain name into labels, and a false label generator program that generates one or more false labels to include in a query. Memory 217 may also include other programs that perform other functions and processes, such as programs that provide communication support, Internet access, and the like.

Methods, systems, and articles of manufacture consistent with disclosed embodiments are not limited to separate programs or computers configured to perform dedicated tasks. For example, memory 217 may be configured with a privacy enhancement program that performs several functions when executed by processor 211. For example, memory 217 may include a single program that performs the functions of the privacy enhanced system 200, or privacy enhancement program 218 could comprise multiple programs. Moreover, processor 211 may execute one or more programs located remotely from privacy enhanced server 210. For example, privacy enhanced server 210 may access one or more remote programs that, when executed, perform functions related to disclosed embodiments.

Memory 117 may be also be configured with an operating system (not shown) that performs several functions well known in the art when executed by privacy enhanced server 110. By way of example, the operating system may be Microsoft Windows™, Unix™, Linux™, Solaris™, an Apple Computers operating system, Personal Digital Assistant operating system such as Microsoft CE™, or some other operating system. The choice of operating system, and even to the use of an operating system, is not critical to any embodiment.

Privacy enhanced server 210 may include one or more I/O devices (not shown) that allow data to be received and/or transmitted by privacy enhanced server 210. I/O devices may also include one or more digital and/or analog communication input/output devices that allow privacy enhanced server 210 to communicate with other machines and devices, such as client 220, first server 240, and/or second server 250. Privacy enhanced server 210 may receive data from external machines and devices and output data to external machines and devices via I/O devices. The configuration and number of input and/or output devices incorporated in I/O devices may vary as appropriate for certain embodiments.

Privacy enhanced server 210 may also be communicatively connected to one or more clients 220 through network 230. Client 220 may include one or more interconnected components, such as a processor 221, a memory 223, an application 225, such as a web browser, and a DNS resolver 227 including a local cache 228 to communicate with one or more of privacy enhanced server 210, network 230, first server 240, and/or second server 250. DNS resolver 227 may be a stub resolver or a recursive resolver. In some embodiments, application 225 may send requests to and receive responses from one or more of resolvers 215 or 227 corresponding to a nameserver name and/or IP address associated with a domain name.

First server 240 and second server 250 may each be a computing system that performs various functions. In some embodiments, servers 240 and 250 may be configured as authoritative nameservers for a particular domain. For example, first server 240 may be a root nameserver which answers requests for records in the root zone and returns nameserver names and/or IP addresses associated with the authoritative nameservers for a top level domain. As another example, first server 240 may be an authoritative nameserver for a top level domain, such as the authoritative nameserver for ".com." In response to queries for a requested IP address associated with a domain name from one or more of DNS resolvers 215 and 227, first server 240 and/or second server 250 may provide responsive information indicating additional nameserver names and/or IP addresses that one or more of the resolvers 215 and 227 can contact to obtain the requested nameserver name and/or IP address. DNS resolvers 215 and/or 227 may also provide the requested nameserver name and/or IP address itself.

The arrangement illustrated in FIG. 2 is exemplary and system 200 may be implemented in a number of different configurations without departing from the scope of the present invention. For example, server 210 and client 220 may be directly connected, as opposed to being connected via network 230. Further, additional components may be included in system 200, such as a connection to other servers or systems that may provide information to server 210. As another example, privacy enhancement programs 218 may be located within resolver 215, and resolver 215 may be located within memory 217 or somewhere within client 220. Moreover, cache 216, 228 can be located externally from resolvers 215, 227. In addition, one or more clients 220 may be included within privacy enhanced server 210, thus allowing server 210 to receive requests from a user operating server 210 itself.

Figure 3:
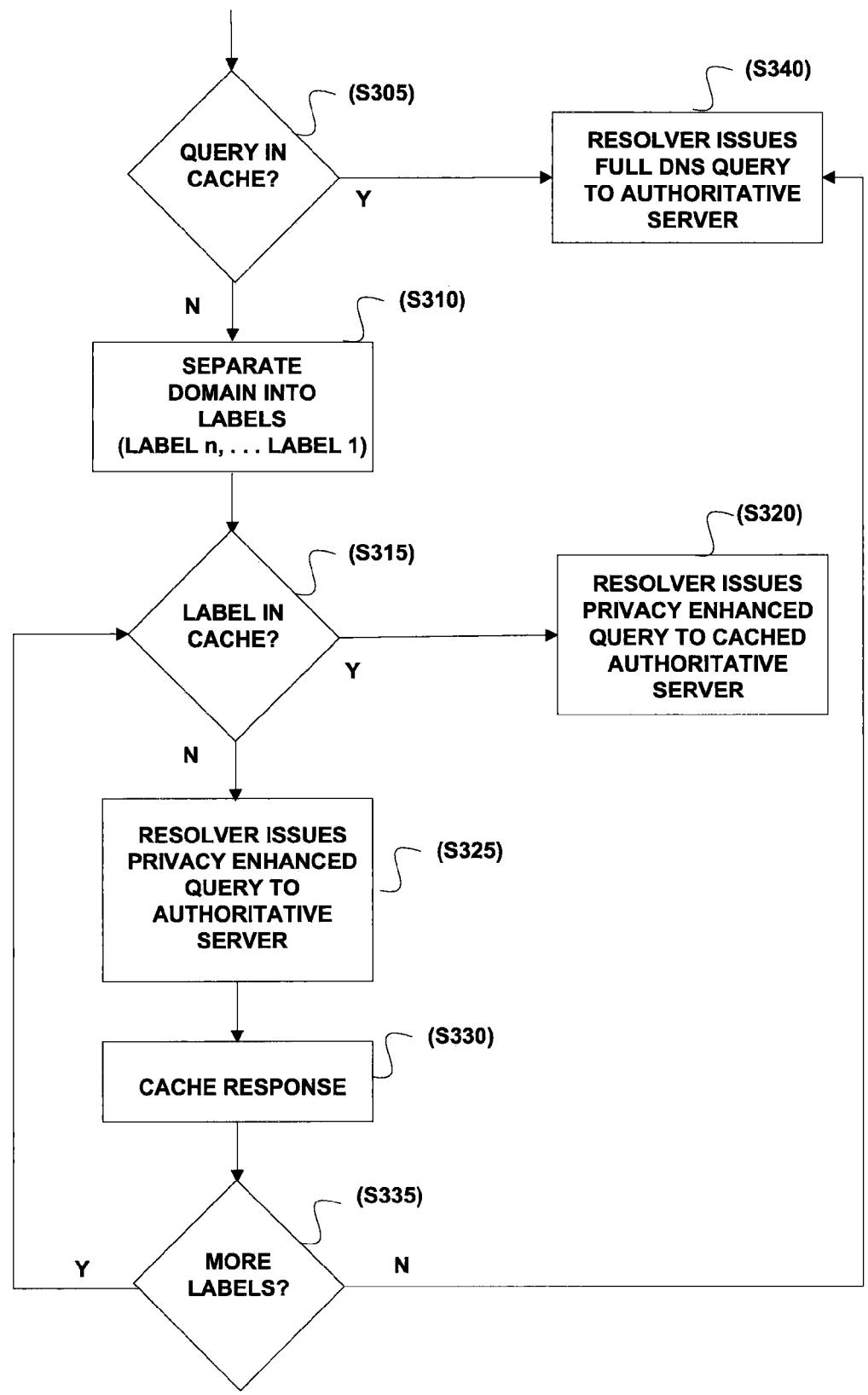
FIG. 3 is flow diagram illustrating exemplary processes performed by a privacy enhanced server consistent with exemplary embodiments.

FIG. 3 is flow diagram illustrating exemplary processes performed by privacy enhanced server 210, consistent with exemplary embodiments. After receiving a request to resolve an IP address associated with a particular domain name from one or more of application 225, client DNS resolver 227, and another source, resolver 215 may determine whether or not cache 216 includes the nameserver records (NS set) for the authoritative server of the requested domain name (S305). If cache 216 does not include the appropriate NS set, one or more privacy enhancement programs 118 may separate the domain name included in the query into one or more labels (S310). Starting with the label at the highest level in the hierarchical DNS (generally a TLD such as .com) and working its way down the hierarchy, the resolver 215 may determine whether or not cache 216 includes the NS set for that particular label (S315). If so, resolver 215 may issue a privacy enhanced DNS query to the authoritative nameserver contained in cache 216 for that particular label (S320). While in this exemplary embodiment the process starts with the label at the highest level in the domain name hierarchy and moves deeper within the hierarchy, embodiments consistent with the present invention could be implemented at any level or levels within the hierarchy, as desired by a resolver operator. For example, a resolver operator could configure a resolver to only issue privacy enhanced queries for a third-level domain and a fifth-level domain. As another example, a resolver operator could configure a resolver to issue privacy enhanced queries for every level of the domain name.

The privacy enhanced query is a query that obfuscates the original query by not including one or more of the labels from the domain name that do not affect the query response of the authoritative nameserver. The labels that are included or not included within the query may be set by a resolver operator. In addition to not including one or more of the labels, the privacy enhanced query may include one or more generated false labels. These false labels may be predetermined or may be cryptographically generated such that the false labels do not disclose information about the corresponding label in the domain name included in the original request. The false labels may comprise any number or type of characters in any number of languages or may consist of any other information that helps obscure domain name included in the original query. A resolver operator may configure a resolver to include or not include the false label based on the level of the label the false label is replacing.

If cache 216 does not include the NS set for that particular label, resolver may issue a privacy enhanced DNS query to an authoritative server for the particular label (e.g. first server 240) (S325), which in the case of a TLD would be the root server. First server 240 may return a response to the privacy enhanced query referring the resolver to a second authoritative server (e.g., second server 250), and resolver 215 may cache the response (S330). Resolver 215 may also determine whether the original query included more labels and, if so, would continue to perform privacy enhanced queries label by label (S335). If there aren't any additional labels, the resolver may issue a final and full DNS query including all of the original labels to the server authoritative for the entire domain name (S340).

The process shown in FIG. 3 is exemplary, and system 200 may implement any number of process without departing from the scope of the invention. For example, labels may be treated collectively rather than individually. Instead of determining if a first label is in cache and, if so, querying the first label for information regarding a second label, resolver 215 may determine if a first label is in cache and, if so, whether the second label is in cache before querying any resolvers. As another example, steps may be omitted or added to the process shown in FIG. 3, such as clearing the cache sometime during the process, or not determining whether the NS set for each label is in cache.

Figure 4:
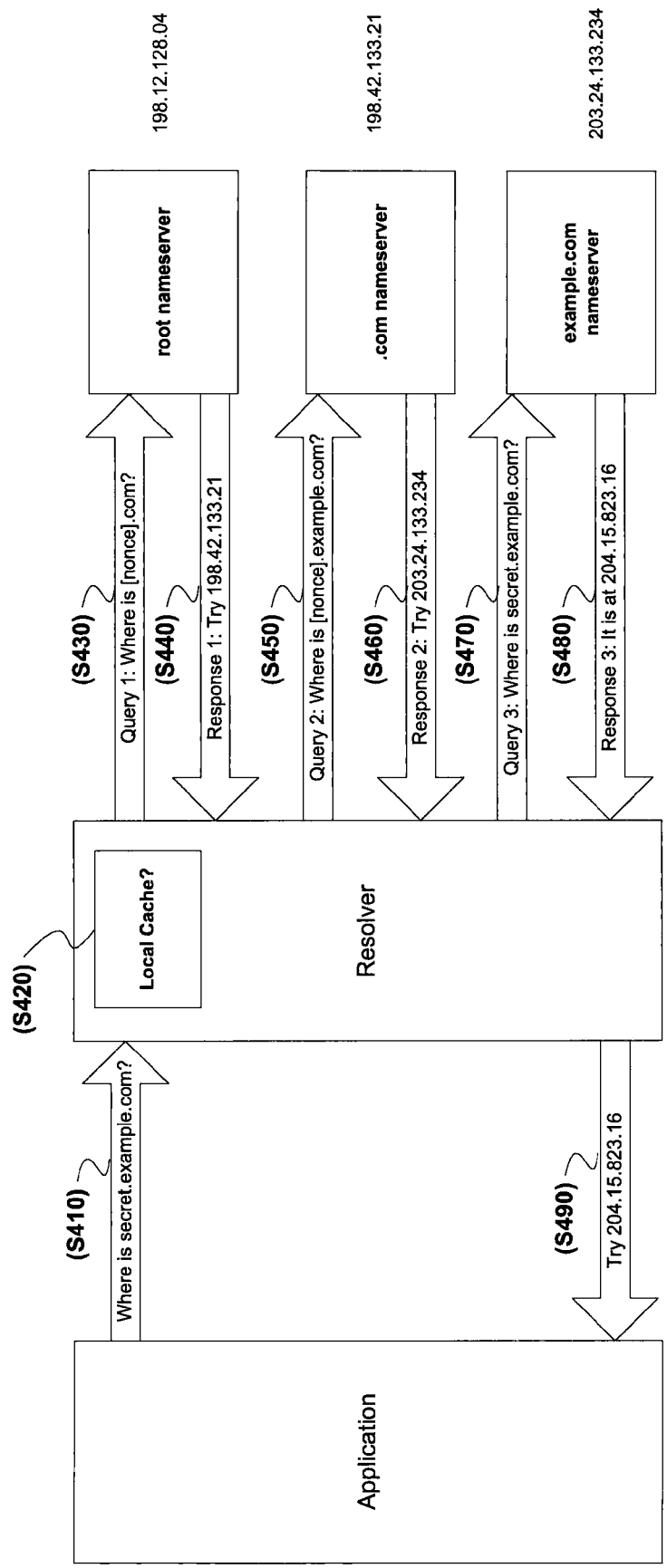
FIG. 4 is a diagram illustrating an exemplary process consistent with exemplary embodiments for obtaining a resource record type (e.g., IP address) for "secret.example.com" using privacy enhanced queries.

FIG. 4 is a diagram illustrating an exemplary process for obtaining a nameserver name and/or resource record type (e.g., IP address) associated with the domain name "secret.example.com" using privacy enhanced queries. As shown in FIG. 4, an application sends a request for an IP address associated with "secret.example.com" to a resolver (S410). As will be appreciated, in other embodiments, the request may be for a nameserver name associated with the domain name "secret.example.com." In yet other embodiments, the request may be for other types of resource record types associated with the domain name "secret.example.com."

In addition to IP addresses, other illustrative resource record types may include an address record (A type), an authoritative name server (NS type), a mail destination (MD type), a mail forwarder (MF type), a canonical name for an alias (CNAME type), a start of a zone of authority (a SOA type), a mailbox domain name (MB type), a mail group member (MG type), a mail rename domain name (MR type), a null RR (NULL type), a well known service description (WKS type), a domain name pointer (PTR type), host information (HINFO type), a mail exchange record (MX type), a text string or record (TXT type), a responsible person (RP type), an AFS data base location (AFSDB type), an X.25 PSDN address (X25 type), an ISDN address (ISDN type), a route through (RT type), a NSAP address (NSAP type), a security signature (SIG type), a security key (KEY type), X.400 mail mapping information (PX type), a geographical position (GPOS type), an IP6 address (AAAA type), location information (LOC type), next domain (NXT type), an endpoint identifier (EID type), a nimrod locator (NIMLOC type), a server selection (SRV type), an ATM address (ATMA type), a naming authority pointer (NAPTR type), a key exchanger (KX type), a cert (CERT type), an A6 (A6 type), a DNAME (DNAME type), a SINK (SINK type), an OPT (OPT type), an APL (APL type), a delegation signer (DS type), a SSH key fingerprint (SSHFP type), an IPSECKEY (IPSECKEY type), an RRSIG (RRSIG type), an NSEC (NSEC type), a DNSKEY (DNSKEY type), a DHCID (DHCID type), an NSEC3 (NSEC3 type), an NSEC3PARAM (NSEC3PARAM type), a TLSA (TLSA type), a host identity protocol (HIP type), a NINFO (NINFO type), an RKEY (RKEY type), a trust anchor link (TALINK type), a child DS (CDS type), a DNSKEY the child wants reflected in the DS (CDNSKEY type), an openpgp key (OPENPGPKEY type), an SPF, a UINFO, a UID, a GID, a UNSPEC, a NID, an L32, an L64, an LP, an EUI-48 address (EUI48 type), an EUI-64 address (EUI64 type), a transaction key (TKEY type), a transaction signature (TSIG type), an incremental transfer (IXFR type), a transfer of an entire zone (AXFR type), a mailbox-related RRs (MAILB type), a mail agent RRS (MAILA type), a request for all records the server/cache has available (* type), a URI (URI type), a certification authority restriction (CAA type), a DNSSEC trust authorities (TA type), a DNSSEC lookaside validation (DLV type), or any other RR type that may be used in a DNS message.

Subsequently, the resolver may determine whether the cache includes the nameserver records (the NS set) for the authoritative zone, example.com (S420). If the cache includes the appropriate NS set, the resolver will return the appropriate nameserver name and/or resource record type (e.g., IP address) to the application, otherwise the resolver will query the root nameserver for the nameserver name and/or resource record type (e.g., IP address) associated with "[nonce].com" (or simply ".com") (S430), where [nonce] is a false label. In response, the root server provides the resolver with the designated authoritative nameserver for the appropriate TLD, in this case, the .com nameserver (S440). The resolver may then query the .com nameserver for the nameserver name and/or resource record type (e.g., IP address) associated with "[nonce]. example.com" (or "example.com") (S450) and receives a response directing the resolver to the example.com nameserver (S460). The resolver then queries the example.com nameserver (S470) and receives a response indicating the nameserver name and/or resource record type (e.g., IP address) of "secret.example.com" (S480). After receiving the nameserver name and/or resource record type (e.g., IP address), the resolver transmits the received address to the requesting application (S490). While this figure only depicts the use of one false label, any number of false labels may be used either alone or in combination with labels from the original query (e.g., "[nonce].[nonce.].com" or "[nonce].secret.[nonce].com").

As described above, systems and methods consistent with the invention provide a privacy enhanced resolution in the domain name system. For purposes of explanation only, certain aspects and embodiments are described herein with reference to the components illustrated in FIG. 2. The functionality of the illustrated components may overlap, however, and may be present in a fewer or greater number of elements and components. Further, all or part of the functionality of the illustrated elements may co-exist or be distributed among several geographically dispersed locations. Moreover, embodiments, features, aspects and principles of the present invention may be implemented in various environments and are not limited to the illustrated environments.

Further, the sequences of events described in one or more of FIGS. 3 and 4 are exemplary and not intended to be limiting. Thus, other process stages may be used, and even with the processes depicted in FIGS. 3 and 4, the particular order of events may vary without departing from the scope of the present invention. Moreover, certain process stages may not be present and additional stages may be implemented in FIGS. 3 and 4. Also, the processes described herein are not inherently related to any particular system or apparatus and may be implemented by any suitable combination of components.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A non-transitory computer-readable medium encoded with instructions that, when executed on a processor, perform a method of minimizing the disclosure of a domain name contained in a domain name system (DNS) query, the method comprising:
   determining a first label and a second label associated with a domain name included in a domain name system (DNS) query;
   querying a first nameserver for a first resource record type associated with the first label without revealing information related to the second label by removing information related to the second label from the DNS query;
   receiving a first response from the first nameserver, the first response including the first resource record type which directs a resolver to a second nameserver;
   querying the second nameserver for a second resource record type associated with the first label and the second label;
   receiving a second response from the second nameserver, the second response including the second resource record type; and
   transmitting at least the second resource record type in response to the DNS query.

2. The non-transitory computer-readable medium of claim 1, the method further comprising generating a false label, wherein the first nameserver is queried for the first resource record type associated with the first label and the false label without revealing information related to the second label by removing information related to the second label from the DNS query.

3. The non-transitory computer-readable medium of claim 1, wherein the first resource record type is selected from the group consisting of an internet protocol address, an address record, a mail exchange record, a service locator record, and a text record.

4. The non-transitory computer-readable medium of claim 1, the method further comprising:
   determining whether at least one of the first resource record type and the second resource record type is stored in a cache before querying at least one of the first nameserver and the second nameserver.

5. The non-transitory computer-readable medium of claim 1, wherein the resolver is a stub resolver.

6. The non-transitory computer-readable medium of claim 1, wherein the resolver is a recursive resolver.

7. The non-transitory computer-readable medium of claim 1, wherein the first label is separated from the second label.

8. A non-transitory computer-readable medium encoded with instructions that, when executed on a processor, perform a method of minimizing the disclosure of a domain name contained in a domain name system (DNS) query, the method comprising:
   determining a first label and a second label associated with a domain name included in a domain name system (DNS) query;
   generating a false label;
   querying a first nameserver for a first resource record type associated with the first label and the false label without revealing the second label to the first nameserver by removing information related to the second label from the DNS query, wherein the first nameserver is a root nameserver;
   receiving a first response from the first nameserver including the first resource record type, the first resource record type directing a resolver to a second nameserver;
   querying the second nameserver for a second resource record type associated with the first label and the second label;
   receiving a second response from the second nameserver including the second resource record type; and
   transmitting at least the second resource record type in response to the DNS query.

9. The non-transitory computer-readable medium of claim 8, wherein the first resource record type is selected from the group consisting an internet protocol address, an address record, a mail exchange record, a service locator record, and a text record.

10. The non-transitory computer-readable medium of claim 8, the method further comprising:
   determining whether at least one of the first resource record type and the second resource record type is stored in a cache before querying at least one of the first nameserver and the second nameserver.

11. The non-transitory computer-readable medium of claim 8, wherein the resolver is one of a stub resolver or a recursive resolver.

12. An apparatus for minimizing the disclosure of a domain name contained in a domain name system (DNS) query, comprising:
   a memory; and
   a processor communicatively coupled to the memory, the processor being configured to:
      determine a first label and a second label associated with a domain name included in a domain name system (DNS) query;
      query a first nameserver for a first resource record type associated with the first label without revealing the second label to the first nameserver by removing information related to the second label from the DNS query;
      receive a first response from the first nameserver including the first resource record type, the first resource record type directing a resolver to a second nameserver;
      query the second nameserver for a second resource record type associated with the first label and the second label;
      receive a second response from the second nameserver including the second resource record type; and
      transmit at least the second resource record type in response to the DNS query.

13. The apparatus of claim 12, wherein the processor is further configured to generate a false label, wherein the first nameserver is queried for the first resource record type associated with the first label and the false label without revealing information related to the second label by removing information related to the second label from the DNS query.

14. The apparatus of claim 12, wherein the first resource record type is selected from the group consisting of an internet protocol address, an address record, a mail exchange record, a service locator record, and a text record.

15. The apparatus of claim 12, wherein the first resource record type is for an authoritative nameserver for the first label.

16. The apparatus of claim 12, wherein the second resource record type is for an authoritative nameserver for a namespace including the first label and the second label.

\* \* \* \* \*